United States Patent
Ortiz

(10) Patent No.: US 8,359,581 B2
(45) Date of Patent: Jan. 22, 2013

(54) AUTOMATIC COLLECTION OF DIAGNOSTIC TRACES IN AN AUTOMATION FRAMEWORK

(75) Inventor: Christopher N. Ortiz, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 12/331,883

(22) Filed: Dec. 10, 2008

(65) Prior Publication Data

US 2010/0146489 A1    Jun. 10, 2010

(51) Int. Cl.
*G06F 9/44*    (2006.01)
*G06F 11/00*    (2006.01)

(52) U.S. Cl. .......... 717/128; 717/126; 717/131; 714/25; 714/37; 714/45

(58) Field of Classification Search .......... None
See application file for complete search history.

(56) References Cited

U.S. PATENT DOCUMENTS

| | | | | |
|---|---|---|---|---|
| 5,428,618 | A * | 6/1995 | Ueki et al. | 717/124 |
| 7,266,808 | B2 * | 9/2007 | Kolawa et al. | 717/126 |
| 7,958,486 | B2 * | 6/2011 | Tsyganskiy et al. | 717/105 |
| 8,037,453 | B1 * | 10/2011 | Zawadzki | 717/123 |
| 2004/0078683 | A1 * | 4/2004 | Buia et al. | 714/37 |
| 2005/0166094 | A1 * | 7/2005 | Blackwell et al. | 714/38 |
| 2007/0006037 | A1 * | 1/2007 | Sargusingh et al. | 714/38 |
| 2009/0125891 | A1 * | 5/2009 | Garimella et al. | 717/131 |
| 2009/0292941 | A1 * | 11/2009 | Ganai et al. | 714/2 |

* cited by examiner

*Primary Examiner* — Henry Tsai
*Assistant Examiner* — Michael Sun
(74) *Attorney, Agent, or Firm* — Cantor Colburn LLP; Dennis Jung

(57) ABSTRACT

A method for software test automation includes receiving system software in a test server; receiving test software and in a test server; configuring test environment resources for the test software; executing an automated test of the test software comprising: performing unit test of the test software; comparing anticipated performance results of the test software with actual results of the test software; determining whether there are differences in the anticipated performance and the actual performance; wherein in the event there are differences in the anticipated performance and the actual performance: applying trace settings; deleting runtime logs associated with the unit test; re-executing the unit test; storing trace data associated with the re-executed unit test; notifying a user of the re-executed unit test; providing the user with the stored trace data; and cleaning up the test environment resources.

8 Claims, 3 Drawing Sheets

AUTOMATIC COLLECTION OF DIAGNOSTIC TRACES IN AN AUTOMATION FRAMEWORK

BACKGROUND

This invention relates generally to software, and more particularly to a method and system for automating the collection of diagnostic traces once a failure has been detected in a software automation test framework, prior to a test environment being torn down.

Test automation is the use of software to control the execution of tests, the comparison of actual outcomes to predicted outcomes, the setting up of test preconditions, and other test control and test reporting functions. Commonly, test automation involves automating a manual process already in place that uses a formalized testing process. Test automation tools assist programmers to quickly create applications that have dramatically improved programmer productivity, as well as decreasing the pressure on testers, who are often perceived as bottlenecks to the delivery of software products. Testers are consistently asked to test more and more programming code in less and less time. Test automation is one way to keep up with the increasing amounts of programming code that requires testing, as manual testing is time consuming. Traditionally, as different versions of software are released, the new features have to be tested manually. However, test automation tools reduce the test time, as well as the cost associated with new software releases.

A framework is an integrated system that sets the rules of automation of a specific product. A framework integrates the function libraries, test data sources, object details and various reusable modules. The components that make up the framework act as small building blocks that need to be assembled in a regular fashion to represent a business process. In the implementation of test automation, a framework may contain a common set of tools, which may consist of a combination of automation scripts to configure resources needed for the test application, and an environment in which to execute the scripts. Thus, frameworks provide the basis of test automation, and hence simplify the automation effort.

A growing trend in software development is to use testing frameworks such as the xUnit frameworks (for example, JUnit and NUnit) which allow the framework code to conduct unit tests to determine whether various sections of new code are acting as expected under various circumstances. Test cases describe tests that need to be run on the program to verify that the program runs as expected.

JUnit is a unit testing framework for the Java programming language. In computer programming, unit testing is a method of testing that verifies the individual units of source code are working properly. Unit testing is typically done by software developers to ensure that the code they have written meets software requirements, and behaves as the developer intended. A unit is the smallest testable part of an application. The goal of unit testing is to isolate each part of the program, and show that the individual parts are correct. Unit testing allows the programmer to refactor code at a later date, and make sure the module still works correctly (i.e., regression testing). Unit testing helps to eliminate uncertainty in the units themselves and may be used in a bottom-up testing style approach. By testing the parts of a program first and then testing the sum of its parts, integration testing becomes much easier.

The procedure for unit testing is to write test cases for all functions and methods so that whenever a change causes a fault, it may be quickly identified and fixed. A unit test provides a strict, written contract that the piece of code must satisfy. As a result, it affords several benefits. Unit tests find problems early in the development cycle. In procedural programming a unit may be an individual program, function, procedure, etc., while in object-oriented programming, the smallest unit is a method, which may belong to a base/super class, abstract class or derived/child class. Ideally, each test case is independent from the others; double objects like stubs, mock or fake objects as well as test harnesses may be used to assist testing a module in isolation.

In software testing, a test harness or automated test framework is a collection of software and test data configured to test a program unit by running it under varying conditions and monitoring its behavior and outputs. A test harness has two main parts: a test execution engine and a test script repository. Test harnesses allow for the automation of tests. Test harnesses may call functions with supplied parameters, and print out and compare the results to the desired value. A test harness is a hook to the developed code, which may be tested using an automation framework. A test harness should allow specific tests to run (this helps in optimizing), orchestrate a runtime environment, and provide a capability to analyze results. The typical objectives of a test harness are to automate the testing process, execute test suites of test cases, and generate associated test reports. A test harness typically provides the following benefits including, increased productivity due to automation of the testing process, increased probability that regression testing will occur, and increased quality of software components and application.

SUMMARY

Embodiments of the present invention provide a method for software test automation, the method includes: receiving system software in a test server; receiving test software and in a test server; configuring test environment resources for the test software; executing an automated test of the test software comprising: performing unit test of the test software; comparing anticipated performance results of the test software with actual results of the test software; determining whether there are differences in the anticipated performance and the actual performance; wherein in the event there are differences in the anticipated performance and the actual performance: applying trace settings; deleting runtime logs associated with the unit test; re-executing the unit test; storing trace data associated with the re-executed unit test; notifying a user of the re-executed unit test; providing the user with the stored trace data; and cleaning up the test environment resources.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Presently, an automation framework used in automatic function verification test (AutoFVT) for software development will generate a defect in the event a failure is detected. In order to investigate the defect, typically a developer would have to recreate the test environment with the proper drive levels, setup the test harness, and execute the tests with tracing enable to collect diagnostic traces.

Embodiments of the invention automate the collection of diagnostic traces once a failure has been detected in an automation framework, prior to a test environment being torn down. Embodiments of the invention check the unit results (JUnit, NUnit, XUnit) before the test begins cleanup. In the event the a unit of software has failed, the automation framework, provided by embodiments of the invention, applies a set of appropriate trace settings to test servers, re-runs the failed test suite, and copies the server trace log for analysis, before the automation frame work starts to cleanup the test environment.

Embodiments of the invention alter the way an automated test reacts to failed tests. In the event a unit test failure is detected prior to the execution of the cleanup phase of a test, the test is rerun with test a specific diagnostic trace setting applied to the configured test application server. In addition, any existing runtime logs are deleted in order to obtain a clean test trace. During the rerunning of the tests, a runtime message log is saved for the defect owner or user.

It is noted that automated test harnesses typically do not run with diagnostic tracing enabled nor are runtime logs saved. The majority of automated tests are daily tests that are expected to pass. The overhead associated with running with the trace settings, and the saving of logs for every test is typically not viewed as necessary. There may be hundreds of daily tests executed. By reacting to a failure when it occurs, and using the existing configured system for generating diagnostic logs, the defect owner (user) is spared from having to recreate the initial work in order to start debugging the failed software test.

Figure 1:
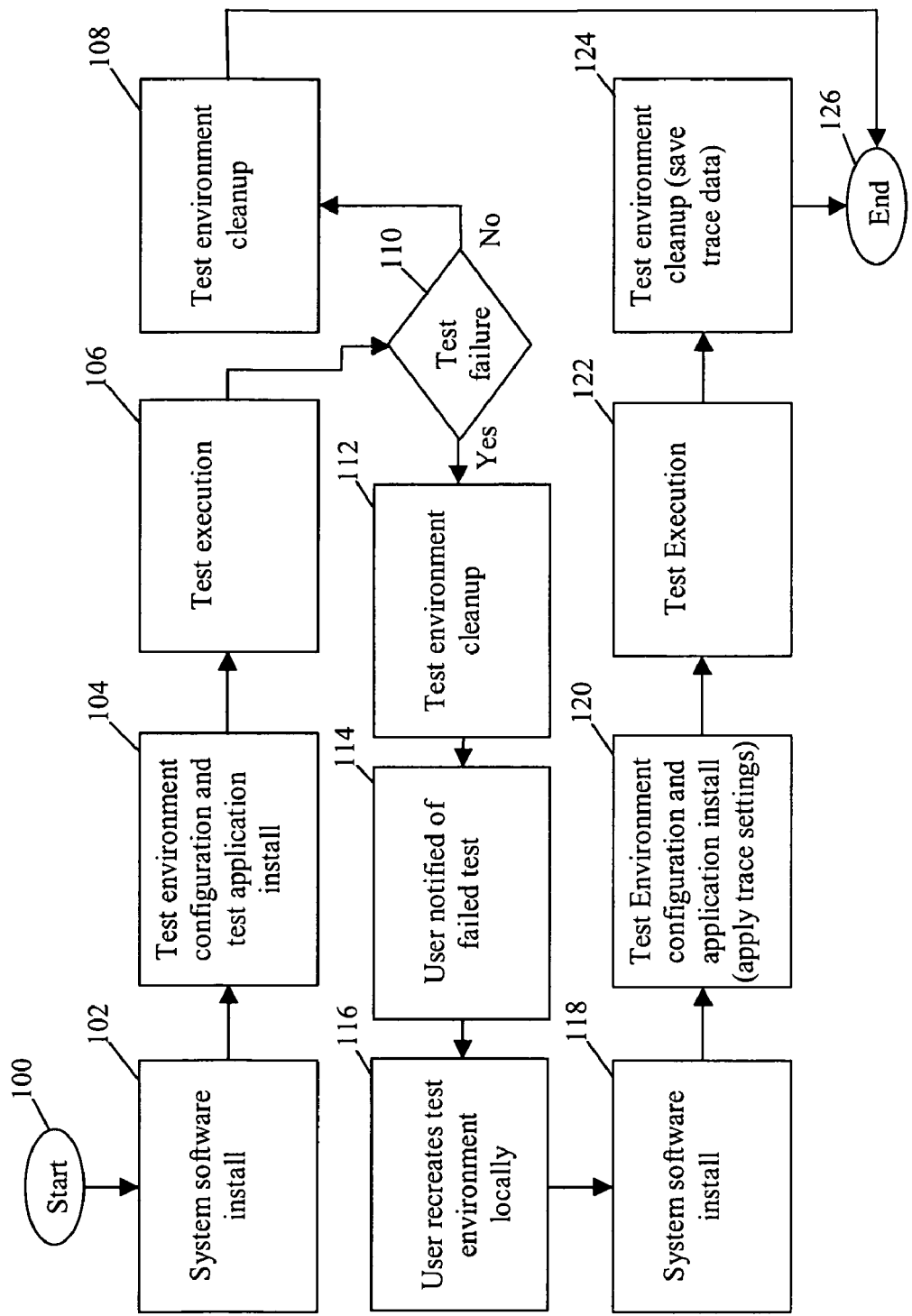
FIG. 1 is a flow chart of existing software testing automation flow.

FIG. 1 is a flow chart of existing software testing automation flow. The process starts (block 100) with an installation of system software, such as fix packs and feature packs for the current level of software product to be tested (block 102), test environment configuration on a server for configuring resources a test application may need, such as databases, security registry configuration, message engines, etc., and the installation of the test application onto the configured application server (block 104). Subsequently, the test is executed (box 106) by executing a test client against a test service to be tested. The test client is usually the JUnit part, and is the application that is executed to perform the test. The test service is usually the part of the code that is actually being tested. A simple example of this could be the testing of a Java method, which returns "Hello World" to the caller. To test this, a Java program (the test client) would call this method (the test service), and compare the return value with the anticipated result "Hello World".

Continuing with FIG. 1, test execution (block 106) is performed by running unit tests and comparing anticipated performance results with actual results. If an anticipated result does not match an actual result, the test results in a failure, and a defect is opened against the current software product level being tested. In the event there is no test failure (decision block 110 is No), the test environment is cleaned up (block 108), and the process concludes (block 126). Cleanup of the test environment includes un-installing the test applications, and removing the test's applications resources. The cleanup leaves the software system in a clean state so additional tests may be run as part of the automated function verification test. Cleanup is necessary since test harnesses (set of daily tests run) may number in the hundreds.

Continuing with FIG. 1, in the event there is a test failure (decision block 110 is Yes), the test environment is cleaned up (block 112), and a user is notified of the failed test (block 114). Since the test environment has been cleaned up, the user must recreate the test environment (block 116), repeat software installation (block 118), repeat the configuration of the test environment with the application of trace setting to document the points of failure, re-execute the test (block 122). Following the re-execution of the test (block 122), the test environment is cleaned up and the trace data is saved (block 124) and the process concludes (block 126).

As may be seen in FIG. 1 with an existing test configuration, the user must go back and recreate the test following a failure, since the test environment is cleaned up prior to recording a test failure.

Figure 2:
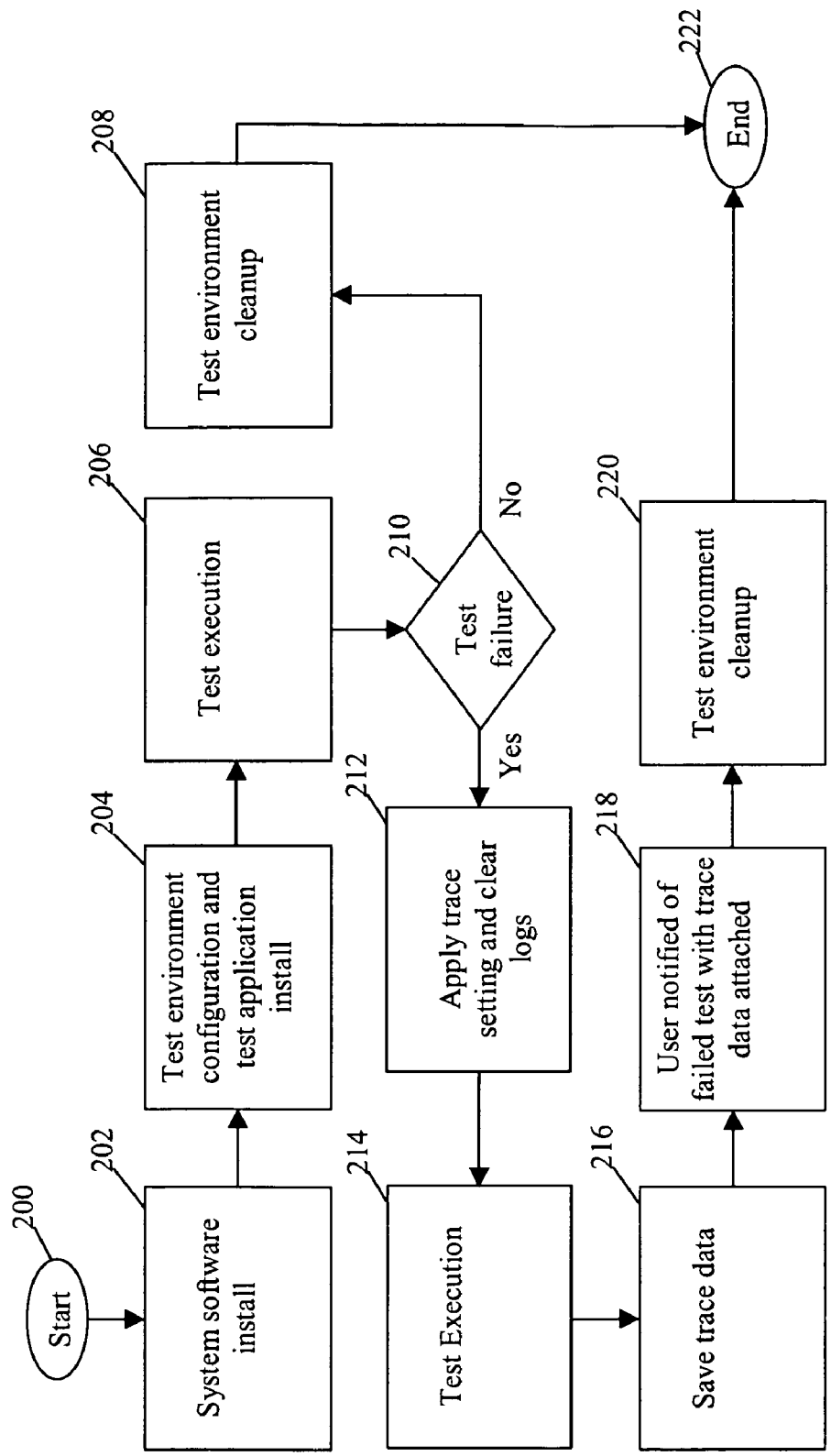
FIG. 2 is a flow chart of a test automation flow with automatic trace collection according to embodiments of the invention.

FIG. 2 is a flow chart of a test automation flow with automatic trace collection according to embodiments of the invention. The process starts (block 200) with an installation of system software (block 202), test environment configuration and the installation of the test application onto the configured application server (block 204). Subsequently, the test is executed (box 206). In the event there is no test failure (decision block 210 is No), the test environment is cleaned up (block 208), and the process concludes (block 222). In the event there is a test failure (i.e. a unit test failure is detected) (decision block 210 is Yes), trace settings are automatically applied, and existing runtime logs are deleted/cleared (block 212). Subsequently the tests are re-executed (block 214), and the trace data is saved/stored (block 216). The user is then notified of the failed test with the trace data attached (block 218). Following the user notification, the test environment is cleaned up (block 220), and the process concludes (block 222)

Enabling tracing to the test software produces a verbose log of the test execution. The log produced by enabling tracing may contain a printed statement from the entrance to every method call, the parameters passed to every method call, the exit from each method call, and any return values from the method call. The trace log may also print out critical decision points in the software, and critical data to that process. A log containing this type of internal software execution is critical to solving software bugs. The trace log helps to isolate the suspect part of the code producing a problem, as well as identifying data that may cause the software to fail for a certain set of values. A log enabled by tracing may get very large and slow down performance so tracing is usually only enabled when a problem has occurred. Logging may be controlled with trace settings to only enable tracing in suspect sections of the software, for example on a Java package level.

Apache Ant is an open source software tool for automating software build processes using the Java programming language. Build automation is the act of scripting or automating a wide variety of tasks that a software developer will generally perform in their day-to-day activities including things like: compiling computer source code into binary code; packaging binary code; running tests; deployment to production systems; and creating documentation and or release notes.

The following Ant script is used to re-run a test to obtain a trace from an autoFVT setup when a JUnit fails The script checks for the need to debug before the script tears down the test environment. First, the script defines these properties:

```
<property name="genTrace" value="false"/>
<property name="compName" value="sca.runtime"/>
``` and adds this errorproperty to the JUnit task:

```
<junit printsummary="yes" fork="false" haltonfailure="no"
    errorproperty="junitFailed">
```

Next, the Ant script sets the following condition for generating a trace upon a failure somewhere in the JUnit task:

```
<condition
    property="genTrace">
    <istrue
    value="${junitFailed}"/>
</condition>
``` and the Ant script add an execution of a debug task (execute.debug) as a dependency to executing a cleanup (execute.cleanup) of the test environment:
    <target name=execute.cleanup depends=setup, execute.debug>
The execute.debug task is then added to perform the generation of a trace:

```
<!-- =============== execute.debug ===================== -->
<target name="execute.debug" if="genTrace">
    <echo message="!!!!!!!!!! JUnit failure detected, applying trace
settings and rerunning tests !!!!!!!!!!"/>
    <antcall target="was.stop" />
    <!-- set trace -->
    <antcall target="wsadmin.execute">
        <param name="script.name" value="setTrace.py" />
        <param name="script.args" value="${sProfileCelIName}
${sProfileNodeName} ${sServerName}
'*=info:SCA=all:SCARTB:=all:SCAAdmin=all:org.apache.tuscany.
*=all'" />
        <param name="script.dir" value="${dir.autoFvt.appMgment}" />
    </antcall>
    <antcall target="was.start" />
    <!-- re run tests -->
    <antcall target="execute.scenarioTests" />
    <!-- need to stop server again to delete the
trace --> <antcall target="was.stop" />
    <!-- copy traces and delete -->
    <mkdir dir="${sTestLogs}/${compName}.trace" />
    <copy todir="${sTestLogs}/${compName}.trace">
        <fileset dir="${sProfileHome}/logs/${sServerName}"
        includes ="trace*.log,
        System*. log" /> <fileset dir="${sProfileHome}/logs/ffdc" />
    </copy>
    <delete>
        <fileset dir="${sProfileHome}/logs/${sServerName}" includes
="trace*.log" /> </delete>
    <!-- unset trace -->
    <antcall target="wsadmin.execute">
        <param name="script.name" value="setTrace.py" />
        <param name="script.args"
        value="${sProfileCelIName} ${sProfileNodeName}
${sServerName} '*=info'" />
        <param name="script.dir" value="${dir.autoFvt.appMgment}" />
    </antcall>
</target>
```

Figure 3:
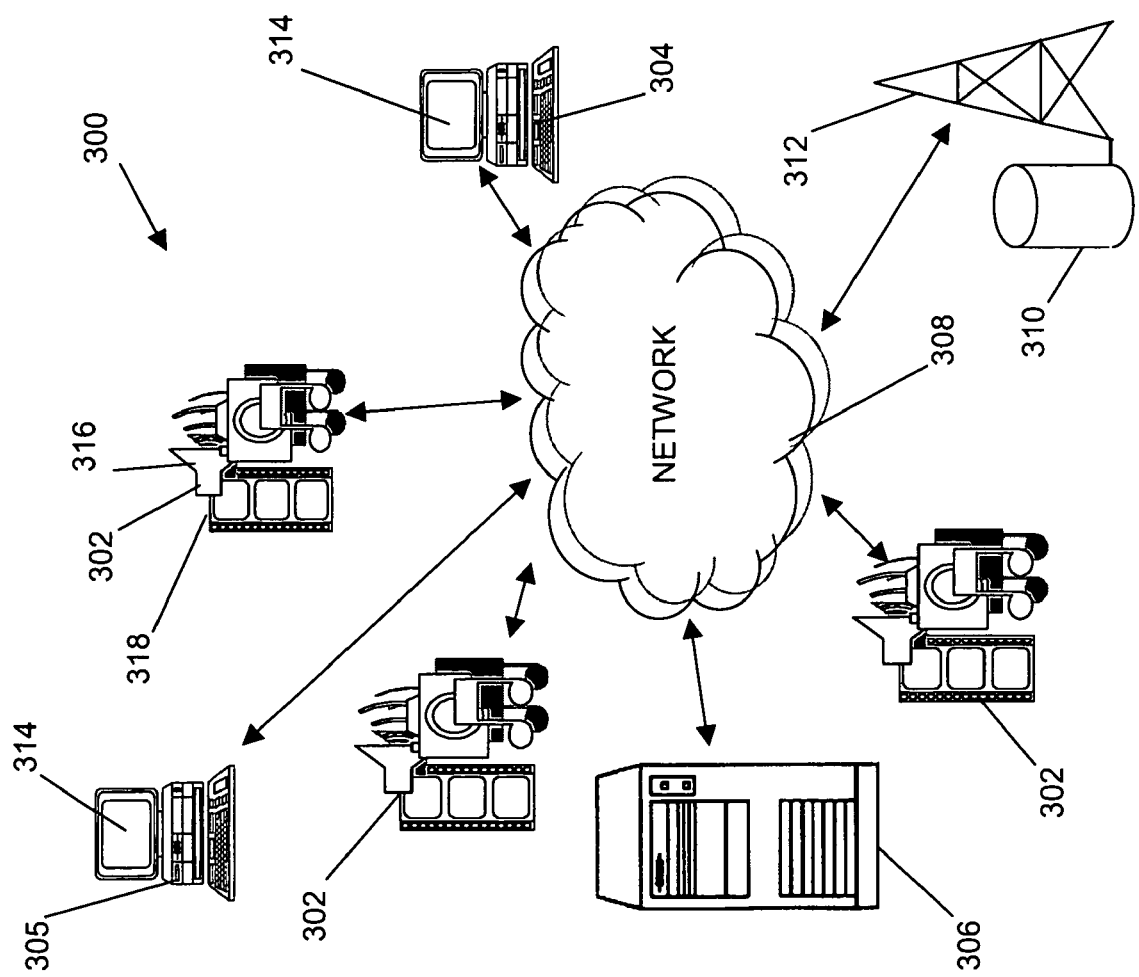
FIG. 3 is a block diagram illustrating an exemplary system that may be utilized to implement exemplary embodiments of the invention.

FIG. 3 is a block diagram illustrating an exemplary system 300 that may be utilized to implement exemplary embodiments of the invention. The system 300 includes remote devices including one or more multimedia/communication devices 302 equipped with speakers 316 for implementing audio, as well as display capabilities 318 for facilitating aspects of the present invention, including the display of the test configuration and application information. In addition, mobile computing devices 304 and desktop computing devices 305 are equipped with displays 314. The remote devices 302 and 304 may be wirelessly connected to a network 308. The network 308 may be any type of known network including a local area network (LAN), wide area network (WAN), global network (e.g., Internet), intranet, etc. with data/Internet capabilities as represented by server 306. Communication aspects of the network are represented by cellular base station 310 and antenna 312. Each remote device 302 and 304 may be implemented using a general-purpose computer executing computer programs. The computer programs may be resident on a storage medium local to the remote devices 302 and 304, or maybe stored on the server system 306 or cellular base station 310. The test automation software for automating the collection of diagnostic traces once a failure has been detected in a test framework is resident on the server system 306. The server system 306 may belong to a public service. The remote devices 302 and 304 and desktop device 305 may be coupled to the server system 306 through multiple networks (e.g., intranet and Internet) so that not all remote devices 302, 304, and desktop device 305 are coupled to the server system 306 via the same network. The remote devices 302, 304, desktop device 305, and the server system 306 may be connected to the network 308 in a wireless fashion, and network 308 may be a wireless network. In a preferred embodiment, the network 308 is a LAN and each remote device 302, 304 and desktop device 305 executes a user interface application (e.g., web browser) to contact the server system 306 through the network 308. Alternatively, the remote devices 302 and 304 may be implemented using a device programmed primarily for accessing network 308 such as a remote client.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for software test automation, the method comprising:
   receiving system software in a test server;
   receiving test software in a test server;
   configuring test environment resources for the test software;
   executing an automated test of the test software comprising:
   performing unit test of the test software;
   comparing anticipated performance results of the test software with actual results of the test software;
   determining whether there are differences in the anticipated performance and the actual performance;
   wherein in the event there are differences in the anticipated performance and the actual performance:
   applying trace settings;
   deleting runtime logs associated with the unit test;
   re-executing the unit test;
   storing trace data associated with the re-executed unit test;
   notifying a user of the re-executed unit test;
   providing the user with the stored trace data; and
   cleaning up the test environment resources.

2. The method of claim 1, wherein test environment resources comprise: databases, security registry configuration, and message engines.

3. The method of claim 1, wherein the cleaning up of the test environment resources also includes un-installing the test software.

4. The method of claim 1, wherein a scripting language is used for performing the software test automation.

5. The method of claim 4, wherein the scripting language is Apache Ant.

6. The method of claim 1, wherein the trace data comprises: a printed statement from entering one or more method calls, one or more parameters passed to the one or more method calls, an exit from each of the one or more method calls, return values from the one or more method calls, print outs of critical decision points in the test software, and critical data in the test software.

7. The method of claim 1, wherein the storing of trace data is controlled with a series of trace settings that define one or more suspect sections of the test software.

8. The method of claim 7, wherein the one or more suspect sections are on a Java package level.

* * * * *